Nov. 9, 1937.  J. A. TASSICK  2,098,440
GLASS MELTING FURNACE
Filed June 26, 1933  2 Sheets-Sheet 1
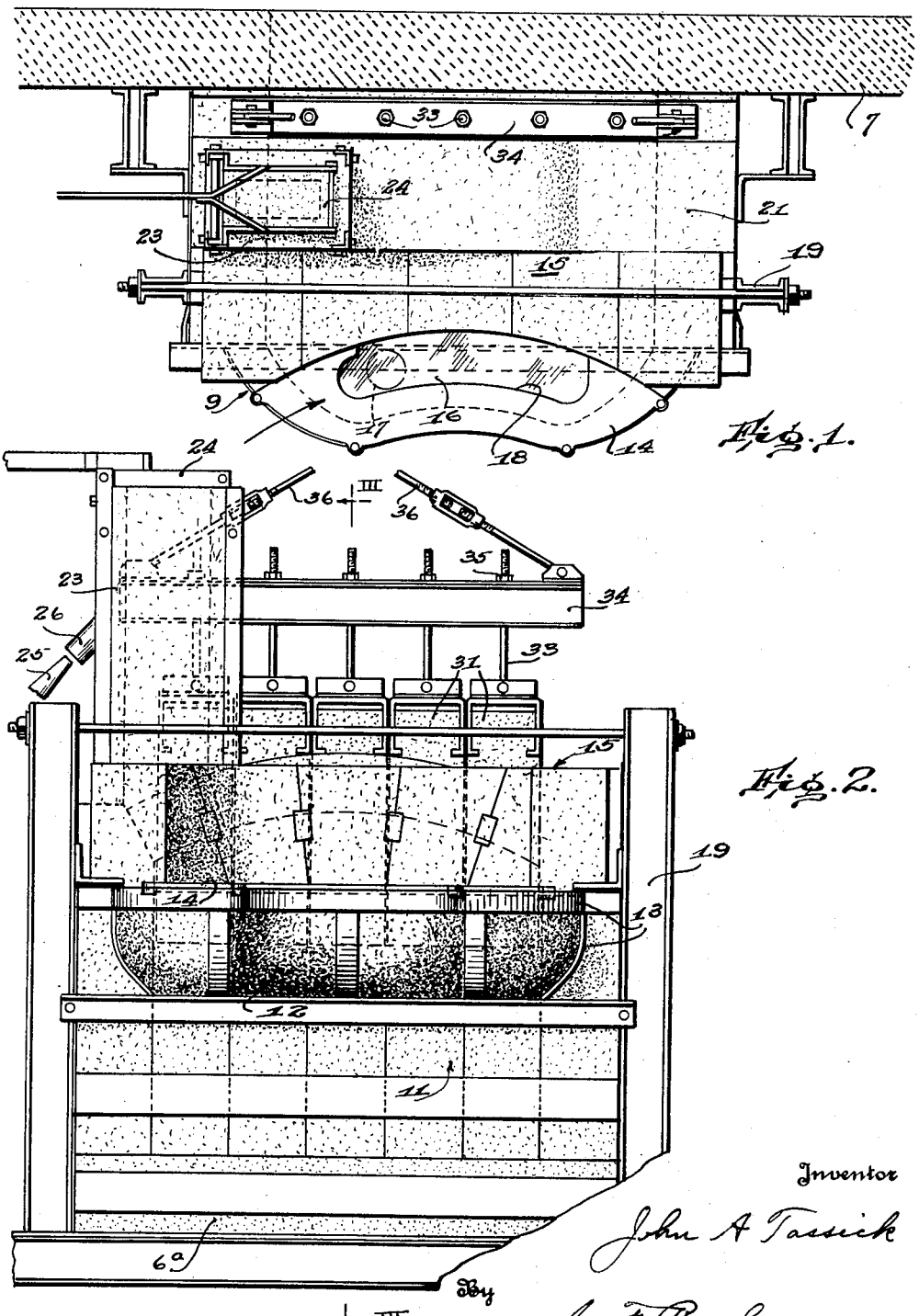
Inventor
John A Tassick
By J. F. Rule
Attorney

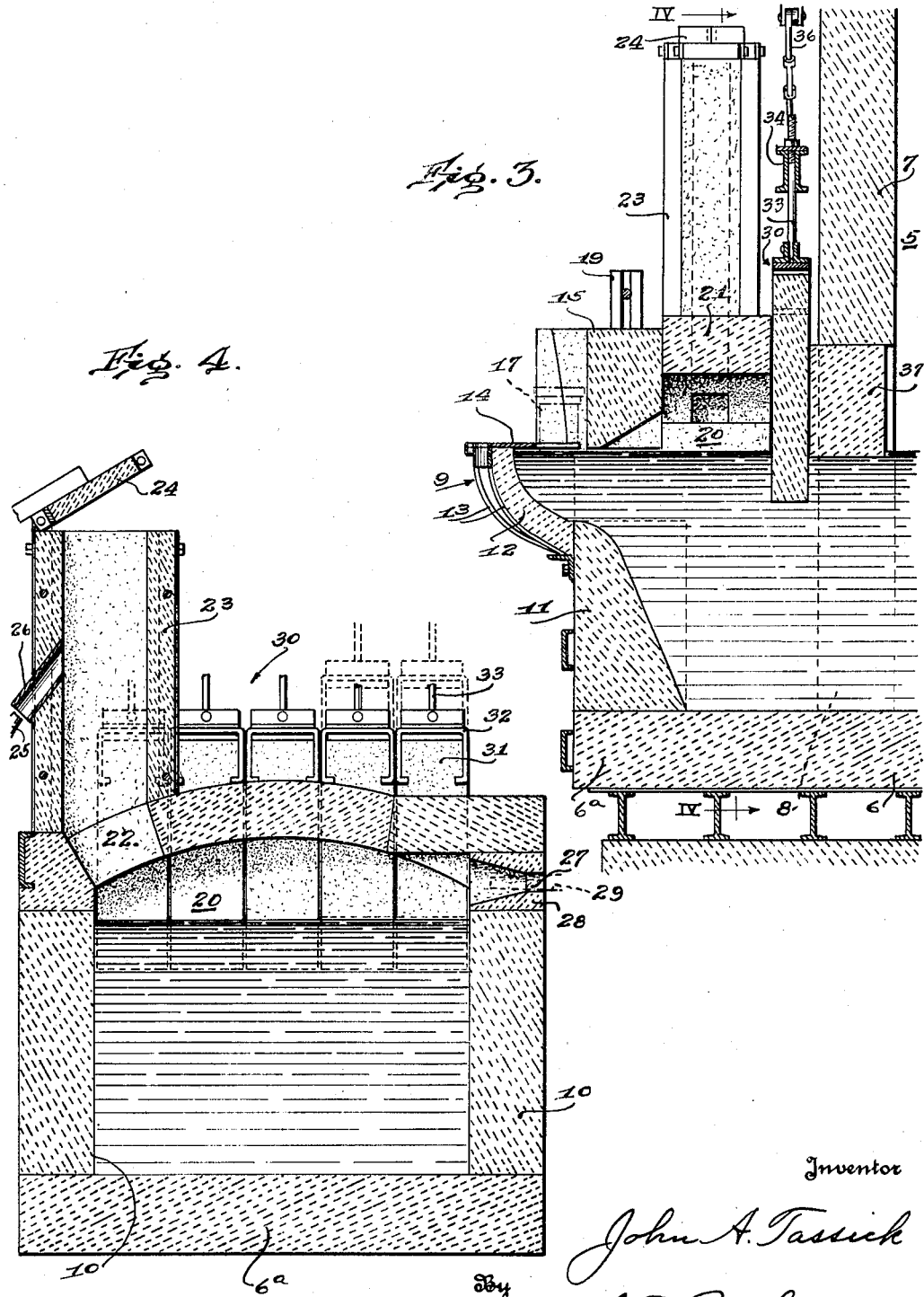

Patented Nov. 9, 1937

2,098,440

UNITED STATES PATENT OFFICE 2,098,440

GLASS MELTING FURNACE

John A. Tassick, Streator, Ill., assignor to Owens-Illinois Glass Company, a corporation of Ohio Application June 26, 1933, Serial No. 677,594

4 Claims. (Cl. 49—56)

The present invention relates to improvements in glass melting furnaces and more particularly to means for regulably controlling the temperature and viscosity of glass delivered to a forebay from which mold charges are gathered periodically by a suction type forming machine.

The production of quality glassware, such for example as bottles and jars, on automatic machines of the suction type is dependent to a large extent upon the maintenance of proper temperature in and homogeneity of the glass at the gathering point. The medium for controlling and regulating these conditions should be such that variations in the size of the articles being manufactured and other changes in operating conditions requiring temperature changes in the delivered glass may be compensated for quickly and with facility. In this connection, for example, it will be understood that in commercial practice there should be and in fact of necessity is, an appreciable difference in the temperature of glass utilized in the production of six and fourteen ounce glass containers. In the production of either of these sizes it is highly desirable that the ideal temperature and viscosity conditions be maintained constant in order that the operator may be certain that a predetermined adjustment of the cycle of operations involving set, though adjustable, blowing time, blank transferring point, etc., will result in the production over an indefinite period of time of articles of uniform quality. Frequently the conditions of the glass, as regards temperature and viscosity, change with considerable rapidity solely as the result of changes in atmospheric conditions. It has been impractical if not impossible heretofore to compensate for these changes in glass conditions without great difficulty and considerable loss of the glassware produced, such loss resulting from the setting up of excessive strains and stresses in the glass structure and other similar defects, the greater part of which are caused by the lack of homogeneity in the glass in the gathering area. The foregoing statements are particularly applicable where the forming machine is gathering mold charges from an exposed area of glass in a stationary forebay which receives its supply of glass directly from the refining end of the melting tank or furnace proper.

An object of the present invention is the provision of novel means operating in conjunction with a stationary forebay to regulably control the temperature of the glass flowing into the latter by providing for variation of the level at which the glass is drawn from the main supply body. To this end there is arranged between the main supply body of glass and the forebay a vertically adjustable gate, the lower end of all or a portion of which may be projected into the glass. The extent of such projection of the gate is determined by the temperature desired in the glass in the gathering area. In this connection it will be understood that the temperature of the glass is different at various levels, the hottest being at the surface.

Another object is the provision of means cooperating with the gate and in a sense functioning as a "fine control" for regulating and controlling the temperature of the glass in proximity to and in the gathering area. To this end there is arranged in front of the gate which constitutes what might be known as a "coarse control", a conditioning chamber through which a temperature control medium may be circulated for applying heat to or removing heat from the surface glass substantially at the time it enters the gathering area.

A further object is the provision about the outer margin of the gathering area of means operating to materially retard dissipation of heat from the glass at this point and practically assuring maintenance of ideal conditions in the glass at the gathering point, provided, of course, these conditions existed at the time the glass first entered the gathering area. To this end there is provided an overhanging ledge or cover plate projecting inwardly over a part of the glass in the forebay or trough and defining the outer margin of the gathering area. This ledge or plate effectively retards dissipation of heat as just pointed out and additionally radiates heat which materially assists in maintaining the desired temperature and viscosity conditions in the glass. Together, the gate, conditioning chamber, and ledge or cover plate, assure regulable control of the glass temperature and delivery of properly conditioned glass to molds of the forming machine.

Other objects will be in part apparent and in part pointed out hereinafter.

In the drawings:

Fig. 1 is a top plan view.

Fig. 2 is a front elevational view.

Fig. 3 is a sectional view taken along the line III—III of Fig. 2.

Fig. 4 is a sectional view taken along the line IV—IV of Fig. 3.

In more or less general terms the invention consists of a glass melting tank or furnace connected to a forebay providing an exposed area of molten glass from which the blank molds of a suction type forming machine gather mold charges at regular time intervals. The glass is delivered to the gathering area by way of a horizontal opening in a side wall of the furnace and a conditioning chamber provided between the furnace wall and forebay, the upper wall of the opening preferably being just below the normal surface level of the supply body so that surface scum and the like cannot reach the molds. Means interposed between the conditioning chamber and furnace wall in the form of a vertically adjustable gate, serves to regulably control the level at which the glass is drawn from the main supply body and passes from the opening in the furnace wall into the conditioning chamber. The position of this gate in the glass together with the speed at which mold charges are gathered may also determine to a considerable degree the period of time the glass flowing to the gathering area is subjected to the influence of the temperature controlling medium in the conditioning chamber, as will be described in more or less detail hereinafter.

The illustrated embodiment of the invention is shown at the refining end of a melting tank 5 or furnace, including a floor 6 and a vertical end wall 7, the latter having a horizontal outlet opening 8 through which molten glass is adapted to flow from said furnace to a stationary forebay 9. The construction involved in providing the forebay consists of a furnace extension including a floor 6a, a pair of opposed vertical side walls 10 and vertical front wall 11 at the upper end of which is arranged said forebay or trough. This trough has its outer wall 12 in part curved about the axis of rotation of the forming machine (not shown) concentric with the path of travel of the molds to provide for clearance between it and parts of the machine. A metal framework 13 supports a plurality of refractory blocks making up the trough.

A metal cover plate 14 designed to retard dissipation of heat projects inwardly over a portion of the glass in the forebay, said plate being suitably attached to the framework 13 which supports the blocks constituting the trough. This plate is of such shape that together with the jack arch 15 a slot like opening 16 is provided through which a suction blank mold 17 of a bottle blowing machine (not shown) may be projected into contact with the glass in the gathering area. The inner curved edge 18 of this plate defines the outer margin of the gathering area while the curved front wall of the jack arch defines the inner margin of said area. It will be observed in Figs. 1 and 3 that this plate projects inwardly over the glass in the forebay a considerable distance. As a result dissipation of heat from the glass in the vicinity of the gathering area is materially retarded. Moreover heat radiated from the lower side of this plate further assists in the maintenance of the necessary temperature conditions in the glass. The jack arch 15 referred to above may well be of conventional form and include a series of refractory blocks suitably supported by a framework 19 with their lower ends spaced a short distance above the surface of the molten glass. This jack arch in addition to defining the inner margin of the gathering area and preventing excessive outflow of heat constitutes the outer wall of a conditioning chamber 20.

In this conditioning chamber the temperature of the glass flowing to the gathering area may be raised or lowered slightly with a view toward meeting the specific requirements of the article being manufactured. As will be apparent hereinafter this conditioning chamber may if desired constitute in a sense a "fine control" for the temperature and viscosity of the glass, in that the main or "coarse control" is readily obtainable by adjusting the gate 30 referred to hereinafter. The chamber 20 which is of considerably greater length than breadth and has its length extending horizontally parallel to the furnace wall, includes a cover or roof 21 provided at one end with a vertical opening 22 leading to a stack 23. A damper 24 at the upper end of the stack regulates draft conditions in an obvious manner. A blower 25 and an inclined inlet port 26 in the stack provide means for accelerating the exhaust of air through the stack. In the opposite end wall of the conditioning chamber an inlet port 27 is formed in a burner block 28 primarily to accommodate a burner 29. Obviously, if conditions are such that the application of additional heat to the glass in this chamber is not desired the burner 29 may be shut off. In the event application of cooling air to the glass in this chamber is essential to proper conditioning of the glass, the burner 29 may be entirely removed to permit flow of outside air into said chamber. Acceleration of the cooling may be effected by operation of the blower 25 and opening of the damper 24.

Regulation and control of the temperature of the glass entering the conditioning chamber 20 is obtained by adjusting the level at which the glass flows into the furnace extension from the furnace proper. In this connection it will be understood that the temperature drops progressively toward the bottom of the supply body. The construction involved consists of a vertically adjustable gate 30 which incidentally constitutes the inner longitudinal wall of said conditioning chamber 20. This gate is disposed substantially in contact with the end wall 7 of the tank proper and is capable of projection into the glass. Specifically the gate consists of a plurality of individually adjustable refractory blocks 31, each connected at its upper end to a holder 32 which in turn is suspended by means of a connector rod 33 from a horizontal carrier 34. This carrier may well be in the form of a pair of channel bars secured together in spaced relation to permit upward projection of the rod 33 between them. Each rod 33 has its upper end screw threaded and provided with a nut 35 which bears upon the upper surface of the carrier 34. A pair of tie rods 36 secured to the opposite ends of the carrier 34 are adapted to connect the latter to any suitable mechanism (not shown) by means of which simultaneous vertical adjustment of all the blocks may be obtained. As will be apparent presently, adjustment of the gate in addition to controlling and regulating the level at which the glass flows from the furnace proper to the conditioning chamber 20, may also regulably control the period of time the glass is subjected to the influence of the temperature regulating medium in the conditioning chamber.

A skimmer block 37 constitutes the upper wall of the outlet opening 8 in the furnace wall 7 and by having its lower end projecting into the glass functions primarily to clear the surface glass entering the furnace extension of scum and foreign matter which is detrimental to the production of quality glassware. The skimmer block also protects the gate 30 against the deteriorating effect of the intense heat within the furnace and thereby greatly lengthens the life of this gate.

In operation the glass batch is melted in the usual manner and flows to the refining end from which it is drawn into the furnace extension by way of the outlet opening 8 and thence to the forebay. Foreign matter floating on the surface of the glass is prevented from entering the furnace extension by means of the skimmer block 37 which constitutes the upper wall of the outlet opening. In the event the temperature of the surface glass meets the requirements of the particular article being produced on the forming machine, the gate 30 may be adjusted to a position at which its lower end is out of contact with the supply body of glass. Sufficient heat will be applied to the surface glass as it flows through the conditioning chamber 20 to maintain the desired temperature so that when the glass reaches the gathering area it will be in proper condition for gathering and fabrication. The cover plate 14 or ledge, as stated heretofore, contributes greatly and with entire satisfaction to the maintenance in the gathering area of the temperature and viscosity conditions existing at the time the glass enters the forebay by retarding dissipation of heat in this area and radiating heat onto the surface glass in proximity to and in the gathering area.

Should there occur an undesired rise in the temperature of the glass, such as would prevent the production of glassware of suitable quality, the lower ends of the gate blocks 31 at the inlet end of the forebay are projected into the glass to thereby change the level at which the glass is drawn from the supply body. As a result the glass entering the gathering area is colder than previously. Because the gate blocks have a comparatively wide range of adjustment it is possible to regulate and control with considerable accuracy the condition of the glass reaching the forebay.

Moreover, vertical adjustment of the gate blocks regulates the period of time the glass is subjected to the influence of the temperature controlling medium in the conditioning chamber. For example, if the gate blocks project only a comparatively short distance into the glass the path of flow of the glass from the furnace proper to the gathering area will rather closely follow the outline of the lower end of the blocks, rising to the surface while close to the blocks and flowing thence entirely across the full width of the conditioning chamber. Thus the glass will be subjected to the influence of the temperature regulating medium in the conditioning chamber for the maximum period of time. These conditions preferably will exist and be maintained when the articles are of medium or large sizes, such articles requiring hotter glass than small ones and being produced at a slower speed than the latter. On the other hand, small articles are produced at a comparatively high speed and with somewhat colder glass. Under these conditions the gate blocks at the inlet end are lowered with the result that the glass is drawn from a cooler level of the supply body. This adjustment together with the increased speed of operation of the forming machine results in the glass following a shorter path from the gate blocks to the gathering area than with the previous adjustment. Consequently this glass does not move vertically upward to the inner margin of the conditioning chamber but instead tends to take a short path in the general direction of the gathering area reaching the surface of the supply body in said chamber some distance away from the outer surface of the gate blocks. Thus the glass will be subjected to the conditioning operation for a comparatively short period of time. Incidentally, in the event the glass is too hot and the limit of adjustment of the blocks has been reached, or for some reason further adjustment is not desired, cooling air may be circulated through the conditioning chamber merely by removing the burner 29 and operating the blower 25 with the damper open.

With respect to the adjustment of the gate blocks, it will be understood that those blocks at the return end of the conditioning chamber may be so positioned that their lower ends are spaced a short distance above the surface of the glass. Thus return of the glass from the gathering area to the furnace proper for reheating and reassimilation by the main supply body will not be materially retarded. The direction of travel of the molds 17 of the forming machine obviously determines which is the inlet end of the forebay. In the present disclosure the molds are traveling in a clockwise direction (Fig. 1) with the result that their movement through the glass in the gathering area causes circulation of the glass in a counterclockwise direction. Thus the glass enters at the left end of the forebay and flows back into the furnace at the right end.

Modifications may be resorted to within the spirit and scope of the appended claims.

What I claim is:

1. In combination, a glass melting furnace including a side wall having an outlet opening through which glass is adapted to flow from the furnace, a furnace extension exterior to the wall and including a bottom wall disposed at approximately the same level as the bottom of the furnace, side walls for the extension, an upstanding wall at the outer end of the extension, a forebay having its outer margin defined by the upper part of said upstanding wall, said forebay providing an exposed gathering area of glass, a jack arch defining the inner margin of the gathering area, a conditioning chamber overlying the furnace extension between said jack arch and side wall of the furnace, means for regulably controlling the temperature in said chamber and a vertically movable gate interposed between said side wall and the conditioning chamber for regulably controlling the highest level at which glass may enter said furnace extension.

2. In combination, a glass melting furnace including a side wall having an outlet opening through which glass is adapted to flow from the furnace, a furnace extension exterior to the wall and including a bottom wall disposed at approximately the same level as the bottom of the furnace, side walls for the extension, an upstanding wall at the outer end of the extension, a forebay having its outer margin defined by the upper part of said upstanding wall, said forebay providing an exposed gathering area of glass, a jack arch defining the inner margin of the gathering area, a conditioning chamber overlying the furnace extension between said jack arch and side wall of the furnace, means for regulably controlling the temperature in said chamber and a vertically movable gate interposed between said side wall and the conditioning chamber for regulably controlling the highest level at which glass may enter said furnace extension, the length and depth of the extension with respect to the position of the gathering area and outlet opening in the side wall of the furnace being such that with the gate in any adjusted position, glass may flow from the lower end of the gate to the gathering area along a straight path.

3. In combination a glass melting furnace including a side wall having a glass outlet opening extending substantially from the bottom of the furnace to near the top of the glass space in said furnace and through which glass is adapted to flow, a furnace extension exterior of the said side wall and bounded by a bottom wall disposed at approximately the same level as the bottom of the furnace, side walls for the extension and an upstanding wall at the outer end of the extension, the said walls of said extension all cooperating to define a gathering pool with the same substantial depth of glass as that in the melting furnace, a cover for the major portion of said extension, and means including an adjustable gate over the said side wall outlet opening for controlling the temperature of glass at the surface of said gathering pool by controlling the highest level at which the glass may enter said furnace extension.

4. In combination a glass melting furnace including a side wall having a glass outlet opening extending substantially from the bottom of the furnace to near the top of the glass space in said furnace and through which glass is adapted to flow, a furnace extension exterior of the said side wall and bounded by a bottom wall disposed at approximately the same level as the bottom of the furnace, side walls for the extension and an upstanding wall at the outer end of the extension, the said walls of said extension all cooperating to define a gathering pool, a cover for the major portion of said extension, and means including an adjustable gate over the said side wall outlet opening for controlling the temperature of glass at the surface of said gathering pool by controlling the highest level at which the glass may enter said furnace extension.

JOHN A. TASSICK.